United States Patent
Lee et al.

(10) Patent No.: US 10,808,591 B2
(45) Date of Patent: Oct. 20, 2020

(54) SELECTIVE CATALYTIC REDUCTION SYSTEM

(71) Applicant: LG CHEM, LTD., Seoul (KR)

(72) Inventors: Junyoung Lee, Daejeon (KR); Jong Hyuk Park, Daejeon (KR); Jun Won Choi, Daejeon (KR); Chang Hun Yu, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/461,541

(22) PCT Filed: Jan. 9, 2018

(86) PCT No.: PCT/KR2018/000425
§ 371 (c)(1),
(2) Date: May 16, 2019

(87) PCT Pub. No.: WO2018/216876
PCT Pub. Date: Nov. 29, 2018

(65) Prior Publication Data
US 2019/0353072 A1 Nov. 21, 2019

(30) Foreign Application Priority Data

May 24, 2017 (KR) .................. 10-2017-0064194

(51) Int. Cl.
*F01N 3/20* (2006.01)
*F01N 3/28* (2006.01)

(52) U.S. Cl.
CPC ........... *F01N 3/208* (2013.01); *F01N 3/2839* (2013.01)

(58) Field of Classification Search
CPC ....... F01N 3/208; F01N 3/2839; F01N 3/2892
USPC ........................................ 422/168, 176, 177
See application file for complete search history.

(56) References Cited

U.S. PATENT DOCUMENTS

| 4,782,771 | A | 11/1988 | Bergkvist |
| 5,304,749 | A | 4/1994 | Crandell |
| 6,089,347 | A | 7/2000 | Flugger |
| 7,044,992 | B2 | 5/2006 | Frankle et al. |
| 7,281,606 | B2 | 10/2007 | Marocco |

(Continued)

FOREIGN PATENT DOCUMENTS

| DE | 102006055036 A1 | 5/2008 |
| DE | 102008028627 A1 | 10/2009 |

(Continued)

*Primary Examiner* — Tom P Duong
(74) *Attorney, Agent, or Firm* — Dentons US LLP

(57) ABSTRACT

A selective catalytic reduction (SCR) system having a catalytic layer. The SCR includes a plurality of baffle members located in a position spaced apart from a front end of the catalytic layer, the plurality of baffle members reduces a flow deviation due to enlargement of a flow cross-section of a fluid in at least one direction, each of the plurality of baffle members includes a first part and a second part, the first part and the second part of each of the plurality of baffle members extends in an orthogonal direction with respect to the at least one direction of enlargement of the flow cross-section, the first part and the second part are integrated, and each of the plurality of baffle members protrudes in an inlet direction of the fluid.

7 Claims, 3 Drawing Sheets

(56) References Cited

U.S. PATENT DOCUMENTS

| | | | |
|---|---|---|---|
| 8,017,084 B1 * | 9/2011 | Wirt | B01F 3/04049 261/118 |
| 8,209,965 B2 | 7/2012 | Mabuchi | |
| 8,607,555 B2 | 12/2013 | Kaiser et al. | |
| 8,939,638 B2 | 1/2015 | Palmer et al. | |
| 9,095,827 B2 | 8/2015 | Sampath et al. | |
| 9,097,155 B2 | 8/2015 | Hodgson et al. | |
| 9,440,204 B2 | 9/2016 | Palmer et al. | |
| 9,975,093 B2 | 5/2018 | Sampath et al. | |
| 2007/0205046 A1 | 9/2007 | Newberry | |
| 2010/0212292 A1 | 8/2010 | Rusch et al. | |
| 2011/0174408 A1 | 7/2011 | Lundberg et al. | |
| 2012/0224998 A1 | 9/2012 | Lee et al. | |

FOREIGN PATENT DOCUMENTS

| | | |
|---|---|---|
| EP | 2495031 A2 | 9/2012 |
| JP | S59-186413 U | 12/1984 |
| JP | S62-193254 A | 8/1987 |
| JP | H1-097023 U | 6/1989 |
| JP | 2009-068460 A | 4/2009 |
| JP | 2009-138592 A | 6/2009 |
| JP | 58-81060 B2 | 10/2013 |
| KR | 10-1995-0013957 B1 | 11/1995 |
| KR | 10-0836416 B1 | 6/2008 |
| KR | 10-2011-0047020 A | 5/2011 |
| KR | 10-1535362 B1 | 7/2015 |
| KR | 10-2016-0045958 A | 4/2016 |
| KR | 10-2016-0109981 A | 9/2016 |
| KR | 10-2017-0002005 A | 1/2017 |
| WO | 2014/051598 A1 | 4/2014 |

* cited by examiner

[FIG. 1a]
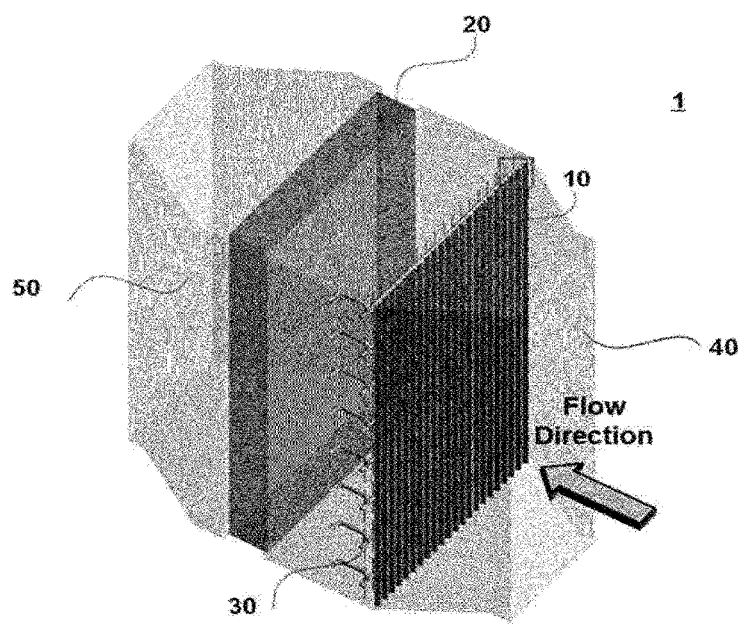
[FIG. 1b]
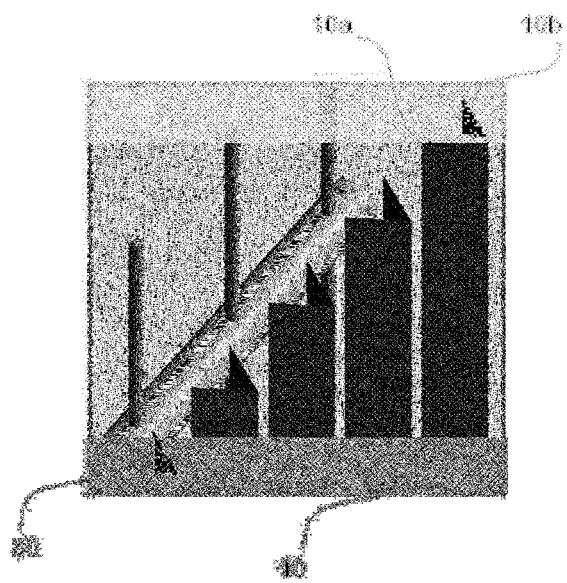

[FIG. 2]
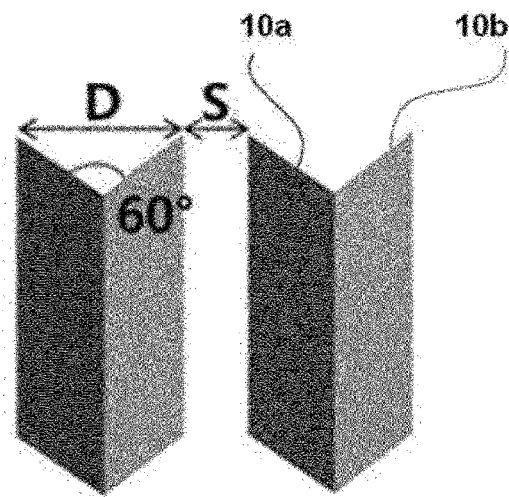
[FIG. 3]
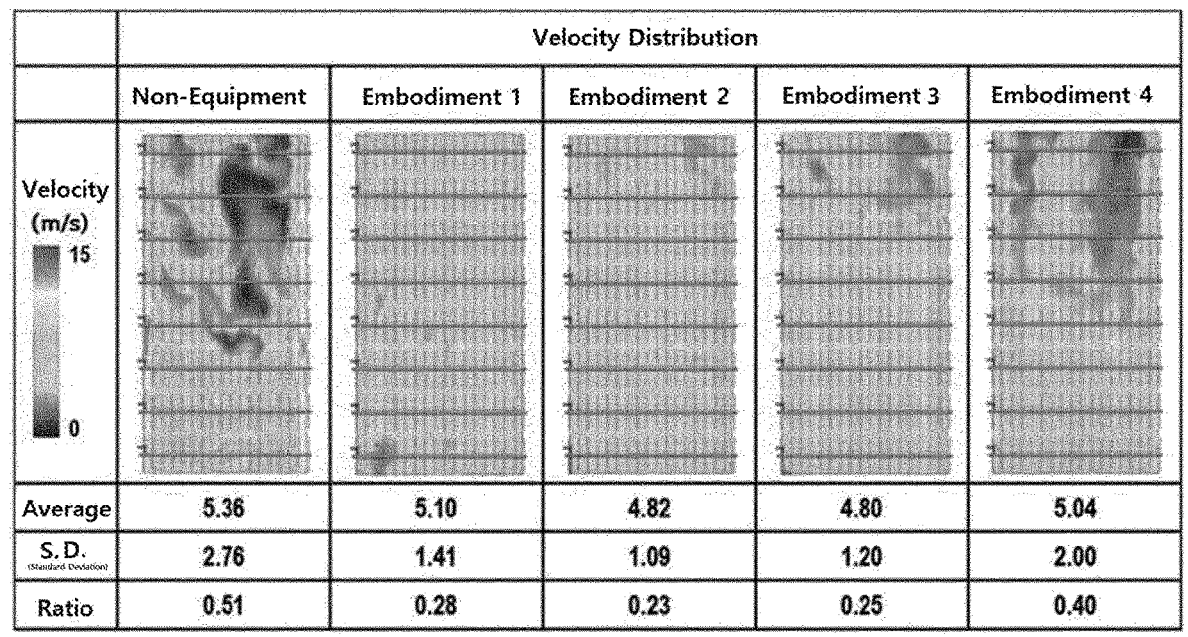

[FIG. 4]
| | Ammonia Mass Ratio Distribution | | | | |
|---|---|---|---|---|---|
| | Non-Equipment | Embodiment 1 | Embodiment 2 | Embodiment 3 | Embodiment 4 |
| Mass Ratio 0.02 – 0.00 |  | 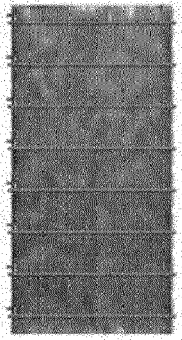 | 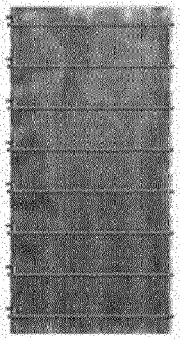 | 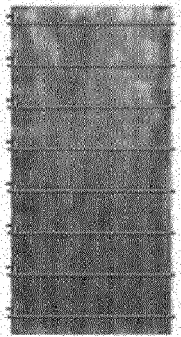 |  |
| Average | 3.7e-3 | 2.5e-3 | 2.6e-3 | 2.6e-3 | 2.9e-3 |
| S.D. (Standard Deviation) | 2.7e-3 | 5.0e-4 | 5.3e-4 | 6.2e-4 | 1.2e-3 |
| Ratio | 0.72 | 0.20 | 0.21 | 0.24 | 0.43 |

SELECTIVE CATALYTIC REDUCTION SYSTEM

CROSS-REFERENCE TO RELATED APPLICATIONS

This application is the U.S. national stage of international application No. PCT/KR2018/000425 filed on Jan. 9, 2018, and claims the benefit of priority to Korean Patent Application No. 10-2017-0064194, filed on May 24, 2017, the entire disclosures of which are incorporated herein by reference.

TECHNICAL FIELD

The present invention relates to a selective catalytic reduction (SCR) system, more particularly a SCR system which comprises a baffle for controlling a flow deviation of fluid such as gas in various systems including a pipe.

BACKGROUND ART

Regulations against air pollutants are being strengthened both domestically and abroad, and there has been made efforts to reduce the pollutants. Among the air pollutants, nitrogen oxides are produced in a combustion process and are technically less controllable than other pollutants. One of the post-treatment facilities that treat nitrogen oxides contained in exhaust gases is a selective catalytic reduction (SCR) system.

DETAILED DESCRIPTION OF THE INVENTION

Technical Problem

The performances of a selective catalytic reduction (SCR) system may be determined by the maintenance of catalyst properties and operation conditions. Particularly, the maintenance of catalyst properties is closely related to the temperature and fluid velocity of the front end of a catalytic layer and the uniformity of mass ratio distribution of ammonia. The conventional techniques have been proposed to maintain the uniformity of flow distribution by installing baffles reflecting the shape of a system, but there is a limit in improving a flow deviation.

The present invention is designed to improve a flow deviation by applying baffle members in regions of the SCR system that the flow deviation occurs.

Technical Solution

In order to accomplish the above aspect, the present invention provides a selective catalytic reduction (SCR) system having a catalytic layer, the SCR comprising a plurality of baffle members located in a position spaced apart from a front end of the catalytic layer, wherein the plurality of baffle members reduces a flow deviation due to enlargement of a flow cross-section of a fluid in at least one direction, wherein each of the plurality of baffle members comprises a first part and a second part, wherein the first part and the second part of each of the plurality of baffle members extends in an orthogonal direction with respect to the at least one direction of enlargement of the flow cross-section, wherein the first part and the second part are integrated, and wherein each of the plurality of baffle members in an inlet direction of the fluid.

Advantageous Effects

The selective catalytic reduction system according to the present invention can surprisingly improve a flow deviation of fluid, which passes through the baffle members, in the front end of a catalytic layer.

BRIEF DESCRIPTION OF THE DRAWINGS

FIG. 1a shows a selective catalytic reduction system comprising a plurality of baffle members according to one embodiment of the present invention, and FIG. 1b is an enlarged view of a part of FIG. 1a.

FIG. 2 shows baffle members according to one embodiment of the present invention.

FIG. 3 shows the velocity distribution of fluid before and after the baffle members of FIG. 2 are equipped.

FIG. 4 shows the mass ratio distribution of ammonia in fluid before and after the baffle members of FIG. 2 are equipped.

BEST MODE

The selective catalytic reduction (SCR) system having a catalytic layer according to the present invention comprises a plurality of baffle members located in the position spaced apart from the front end of the catalytic layer, wherein the plurality of baffle members reduces a flow deviation due to the enlargement of a flow cross-section of a fluid in at least one direction, wherein each of the plurality of baffle members comprises a first part and a second part, wherein the first part and the second part of each of the plurality of baffle members extends in an orthogonal direction with respect to the at least one direction of enlargement the flow cross-section, the first part and the second part are integrated, and each of the plurality of baffle members protrudes in the inlet direction of the fluid.

In the SCR system according to the present invention, each of the plurality of baffle members may have a V-shaped cross-section extending in the orthogonal direction with respect to the at least one of enlargement of the flow cross-section.

In the SCR system according to the present invention, the first part and the second part of each of the plurality of baffle members may form an angle of 45° to 90° therebetween.

In the SCR system according to the present invention, a first end of the first part coincides with a first end of the corresponding second part of each of the plurality of baffle members, a distance between a second end of the first part opposite to the first end and a second end opposite to the first end of the corresponding second part of each of the plurality of baffle members may range from 30 to 200 mm, and a space between each of the plurality of baffle member may range from 30 to 50 mm.

In the SCR system according to the present invention, a space between each of the plurality of baffle member may be constant.

Also, the SCR system according to the present invention may comprise an ammonia injection grid (AIG) spaced apart from a front end of the catalytic layer in a prescribed distance, and the plurality of baffle members may be equipped in the front end of the AIG.

EMBODIMENTS

Hereinafter, the selective catalytic reduction system comprising a plurality of baffle members according to one embodiment of the present invention will be described in detail with reference to the accompanying drawings which illustrate a preferable example of the present invention for the purpose of better explanation, not intended to limit the technical scope of the invention.

Also, the same reference numerals, unless otherwise stated, are used to denote the same or equivalent elements, components or parts illustrated in the drawings, and the repeated explanation thereof will be omitted. In addition, the size and shape of each element, component or part in the drawing may be shown in an enlarged or reduced scale for the sake of convenience.

FIG. 1a shows a selective catalytic reduction (SCR) system 1 comprising a plurality of baffle members 10 for reducing a flow deviation of fluid and a catalytic layer 20 according to one embodiment of the present invention. The fluid enters an inlet 40, passes through the plurality of baffle members 10 and the catalytic layer 20, then emerges from an outlet 50. If the baffle members 10 are not equipped (not shown), the fluid entering the inlet 40 undergoes a flow deviation due to the enlargement of a flow cross-section (see FIGS. 3 and 4).

However, in the SCR system 1 according to the present invention, the plurality of baffle members 10 are equipped spacing from the front end of the catalytic layer 20 in a prescribed distance, thereby minimizing the flow deviation of the fluid entering the inlet 40 which may be generated by the enlargement of a flow cross-section (see FIGS. 3 and 4).

The plurality of baffle members 10 may be installed in a region whose flow cross-section is enlarged and then constant, preferably in the front end of an ammonia injection grid (AIG) 30, as shown in FIG. 1a. Also, FIG. 1a shows an embodiment of the present invention that the flow cross-section of the fluid is horizontally enlarged, and each of the plurality of baffle members 10 is vertically extended.

FIG. 1b is a view enlarging a part of the plurality of baffle members 10 equipped in the front end of the AIG 30 in FIG. 1a. Referring to FIGS. 1a and 1b, each of the baffle members is extended in a vertical direction of the flow cross-section, and also each baffle member comprises a first part 10a and a second part 10b which are integrated. Each of the baffle members 10 is in the form of being protruded into the inlet direction of the fluid. Preferably, each of the baffle members 10 may have a V-shape, more preferably a shape corresponding to two hypotenuses of an isosceles triangle, in a cross-section of an orthogonal direction with respect to the vertical direction, i.e., the direction that the baffle member is extended, but the present invention is not limited thereto. The cross-section of each baffle member 10 may be a triangle shape in a cross-section of an orthogonal direction with respect to the vertical direction, i.e., the direction that the baffle member is extended. That is, the first part 10a and the second part 10b toward the part into which the fluid enters are configured as described above, while the other parts of each baffle member 10 may be variously implemented by way of change or modification.

Meanwhile, if conventional baffles are equipped, it may cause a large pressure difference between the front end and the rear end of the baffles, thereby interrupting good flow of the fluid in the whole SCR system. Accordingly, it is required to reduce the pressure difference in the equipment of the plurality of baffle members. In the case that the plurality of baffle members are equipped according to the present invention, the pressure difference is reduced by 50 Pa (~5 mmH$_2$O) or less to improve a flow deviation in the front end of the catalytic layer 20.

FIG. 2 is a view enlarging a part of the plurality of baffle members 10 shown in FIG. 1a. Each of the baffle members 10 is in the form that one end of the first part 10a coincide with one end of the second part 10b, and an angle between the first part 10a and the second part 10b may range from 45° to 90°, preferably 60°, and a distance (D) between the other end of the first part and the other end of the second part may range from 30 to 200 mm, preferably 50 to 150 mm, more preferably 100 mm. Also, a space (S) between each baffle member 10 may range from 30 to 100 mm, preferably 30 to 50 mm.

Meanwhile, the AIG 30 of the SCR system which may be implemented according to the present invention may have a depth of 4000 to 5000 mm, and the plurality of baffle members 10 may be equipped across the horizontal direction in the front end of the AIG 30. The vertical length of the AIG 30 may range from 4000 to 5000 mm, and in this case, the vertical length of each of the plurality of baffle members 10 may range from 50 to 100 mm. The baffle members may be made of stainless steel, preferably A240 TP310 being austenite stainless steel.

However, the present invention is not limited to the above, and any change or modification can be made to adjust the angle between the first part 10a and the second part 10b, the distance D between the first part 10a and the second part 10b, and the space S between each baffle member 10, according to the environment that the present invention is implemented.

FIG. 3 shows the velocity distribution of fluid in the front end of the catalytic layer 20 before and after the baffle members of FIG. 2 are equipped. In FIG. 3, the case represented by "non-equipment" shows the velocity distribution of the fluid in the front end of the catalytic layer 20 before the baffle members are equipped. In this case, it is shown that the fluid entering the inlet 40 undergoes a flow deviation due to the enlargement of a flow cross-section, and thus the velocity is not uniform in the front end of the catalytic layer 20.

On the contrary, the case of Embodiments 1 to 4 in FIG. 3 show the velocity distribution of the fluid in the front end of the catalytic layer 20 after the baffle members are equipped as in FIG. 1a. Specifically, Embodiment 1 corresponds to the case of D=100 mm and S=30 mm in FIG. 2; Embodiment 2, the case of D=100 mm and S=40 mm in FIG. 2; Embodiment 3, the case of D=100 mm and S=50 mm in FIG. 2; and Embodiment 4, the case of D=100 mm and S=100 mm in FIG. 2. The depth of AIG 30 ranges from 4000 to 5000 mm. Although the flow cross-section of the fluid entering the inlet 40 is enlarged as shown in FIG. 1a, the fluid passes through the baffle members 10 according to one embodiment of the present invention in Embodiments 1 to 4 of FIG. 3, thereby exhibiting uniform velocity in the front end of the catalytic layer 20 without large velocity difference. Particularly, Embodiments 1 to 3 show that the velocity difference of the fluid is remarkably improved.

Further, the velocity distribution uniformity of fluid flow may be determined by applying the concept that (Ratio)=(Standard Deviation)/(Average). The less ratio, the more uniform distribution can be obtained. In the case of non-equipment in FIG. 3 that the baffle members 10 are not equipped, it shows that average is 5.36, standard deviation is 2.76, and ratio (=standard deviation/average) is 0.51. On the contrary, Embodiments 1 to 4 in FIG. 3, that the baffle members 10 are equipped, show that ratio is 0.28, 0.23, 0.25, and 0.40, respectively, which represent improved velocity difference of fluid in the front end of the catalytic layer 20. Particularly, remarkable improvement can be shown in Embodiments 1 to 3. Among these, Embodiment 2 that is the case of D=100 mm and S=40 mm in FIG. 2 shows the best improvement in the velocity difference of fluid in the front end of the catalytic layer 20.

Also, FIG. 4 shows the mass ratio distribution of ammonia (NH$_3$) in the front end of catalytic layer 20 before and after the baffle members of FIG. 2 are equipped. The case represented by non-equipment in FIG. 4 shows the mass ratio distribution of ammonia in the front end of the catalytic layer 20 before the baffle members are equipped. In this case, it is shown that the fluid entering the inlet 40 undergoes a flow deviation due to the enlargement of a flow cross-section, and such fluid passes through AIG 30 while ammonia is diffused in the fluid. At this time, the mass ratio distribution of ammonia within the fluid is not uniform in the front end of catalytic layer 20, due to the flow deviation of the fluid, as can be seen from the case of non-equipment in FIG. 4.

On the contrary, the case of Embodiments 1 to 4 in FIG. 4 show the mass ratio distribution of ammonia in the front end of catalytic layer 20 after the baffle members are equipped as in FIG. 1a. Specifically, Embodiment 1 corresponds to the case of D=100 mm and S=30 mm in FIG. 2; Embodiment 2, the case of D=100 mm and S=40 mm in FIG. 2; Embodiment 3, the case of D=100 mm and S=50 mm in FIG. 2; and Embodiment 4, the case of D=100 mm and S=100 mm in FIG. 2. The depth of AIG 30 ranges from 4000 to 5000 mm. Although the flow cross-section of the fluid entering the inlet 40 is enlarged as shown in FIG. 1a, the fluid passes through the baffle members 10 according to one embodiment of the present invention in Embodiments 1 to 4 of FIG. 4, thereby exhibiting mostly uniform mass ratio distribution of ammonia in the front end of the catalytic layer 20. Particularly, Embodiments 1 to 3 show that the mass ratio difference of ammonia in the fluid is remarkably improved.

Further, the mass ratio distribution uniformity of ammonia in the fluid may be determined by applying the concept that (Ratio)=(Standard Deviation)/(Average). The less ratio, the more uniform distribution can be obtained. In the case of non-equipment in FIG. 4 that the baffle members 10 are not equipped, it shows that average is $3.7e^{-3}$, standard deviation is $2.7e^{-3}$, and ratio (=standard deviation/average) is 0.72. On the contrary, Embodiments 1 to 4 in FIG. 4, that the baffle members 10 are equipped, show that ratio is 0.20, 0.21, 0.24, and 0.43, respectively, which represent improved mass ratio difference of ammonia in the front end of the catalytic layer 20. Particularly, the remarkable improvement can be shown in Embodiments 1 to 3. Among these, Embodiment 1 that is the case of D=100 mm and S=30 mm in FIG. 2 shows the best improvement in the mass ratio difference of ammonia in the front end of the catalytic layer 20.

Although FIG. 1a shows that the flow cross-section of the fluid is horizontally enlarged and the plurality of baffle members 10 are each vertically extended with respect to the flow cross-section, it is only to illustrate one embodiment of the present invention, and the present invention may also implement the case that the flow cross-section of the fluid is vertically enlarged and the plurality of baffle members 10 are each horizontally extended with respect to the flow cross-section, and the case the flow cross-section of the fluid is vertically and horizontally enlarged and the plurality of baffle members 10 are each displaced in the form of a grid of quadrangular pyramid shape. Thus, various change or modification can be made in the present invention.

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

EXPLANATION OF REFERENCE NUMERALS

| 1: | Selective catalytic reduction (SCR) system | 10: | Baffle member |
|---|---|---|---|
| 10a: | First part of baffle member | 10b: | Second part of baffle member |
| 20: | Catalytic layer | 30: | Ammonia injection grid |
| 40: | Inlet | 50: | Outlet |

What is claimed is:

1. A selective catalytic reduction (SCR) system having a catalytic layer,
   the SCR system comprising a plurality of baffle members located in a position spaced apart from a front end of the catalytic layer,
   wherein the plurality of baffle members reduces a flow deviation due to enlargement of a flow cross-section of a fluid in at least one direction,
   wherein each of the plurality of baffle members comprises a first part and a second part,
   wherein the first part and the second part of each of the plurality of baffle members extends in an orthogonal direction with respect to the at least one direction of enlargement of the flow cross-section,
   wherein the first part and the second part are integrated,
   wherein each of the plurality of baffle members protrudes in an inlet direction of the fluid, and
   wherein a space between each of the plurality of baffle members ranges from 30 mm to 50 mm.

2. The SCR system according to claim 1, wherein each of the plurality of baffle members has a V-shaped cross-section extending in the orthogonal direction with respect to the at least one direction of enlargement of the flow cross-section.

3. The SCR system according to claim 1, wherein the first part and the second part of each of the plurality of baffle members form an angle of 45° to 90° therebetween.

4. The SCR system according to claim 1, wherein a first end of the first part coincides with a first end of the corresponding second part of each of the plurality of baffle members, and
   wherein a distance between a second end of the first part opposite to the first end and a second end opposite to the first end of the corresponding second part of each of the plurality of baffle members ranges from 30 mm to 200 mm.

5. The SCR system according to claim 1, wherein a space between each of the plurality of baffle member is constant.

6. The SCR system according to claim 1, further comprising an ammonia injection grid (AIG) spaced apart from a front end of the catalytic layer, wherein the plurality of baffle members are equipped in the front end of the AIG.

7. A selective catalytic reduction (SCR) system having a catalytic layer,
   the SCR system comprising a plurality of baffle members located in a position spaced apart from a front end of the catalytic layer, wherein the plurality of baffle members reduces a flow deviation due to enlargement of a flow cross-section of a fluid in at least one direction, wherein the fluid enters an inlet, passes through the plurality of baffle members and the catalytic layer, and emerges from an outlet, wherein the plurality of baffle members are located at a front end of an ammonia injection grid, wherein each of the plurality of baffle members comprises a first part and a second part, wherein the first part and the second part of each of the plurality of baffle members extends in an orthogonal direction with respect to the at least one direction of enlargement of the flow cross-section, wherein the first part comprises a first end portion farthest from the catalyst layer in the direction of enlargement of the flow cross-section and the second part comprises a first end portion farthest from the catalyst layer in the direction of enlargement of the flow cross-section, wherein the first end portion of the first part and the first end portion of the second part are integrated, wherein a distance between a second end portion of the first part and a second end portion of the second part in the direction of enlargement of the flow cross-section increases with increasing proximity to the catalyst layer, wherein each of the plurality of baffle members protrudes in an inlet direction of the fluid, wherein the plurality of baffle members are spaced apart from each other at a same distance in the direction of enlargement of the flow cross-section, and wherein the fluid passes through a space formed between the plurality of baffle members.

* * * * *